A. M. ELSWORTH.
Distributor for Insect-Destroying Powder.
No. 198,361. Patented Dec. 18, 1877.
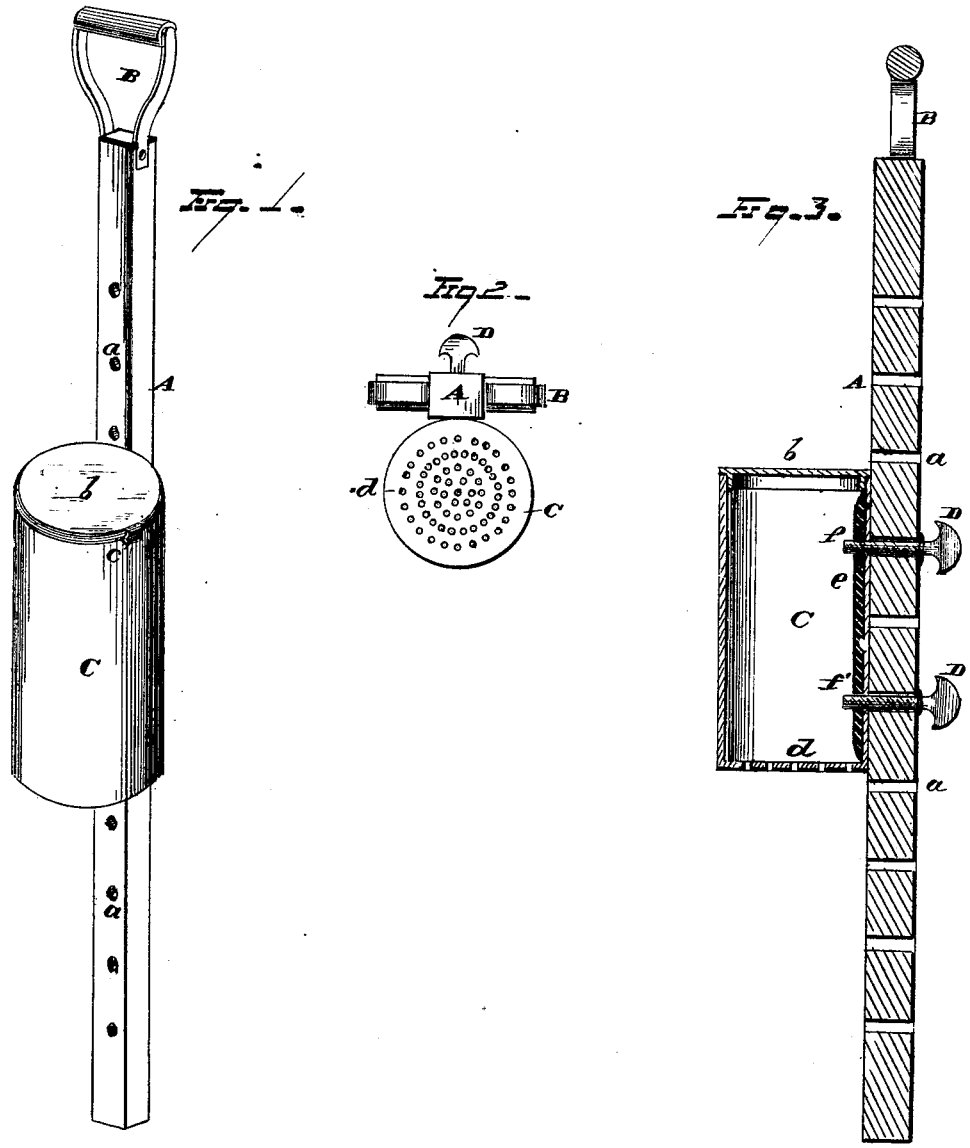

UNITED STATES PATENT OFFICE.

ALMON M. ELSWORTH, OF LOWELL, MICHIGAN.

IMPROVEMENT IN DISTRITUTERS FOR INSECT-DESTROYING POWDERS.

Specification forming part of Letters Patent No. 198,361, dated December 18, 1877; application filed June 15, 1877.

*To all whom it may concern:*

Be it known that I, ALMON M. ELSWORTH, of Lowell, in the county of Kent and State of Michigan, have invented certain new and useful Improvements in Apparatus for Destroying Bugs, &c.; and I do hereby declare the following to be a full, clear, and exact description of the invention, such as will enable others skilled in the art to which it pertains to make and use it, reference being had to the accompanying drawings, which form part of this specification.

My invention relates to an improved apparatus for destroying potato-bugs and distributing fertilizers.

The object of my invention is to provide an apparatus, of few parts and simple construction, that shall be adapted for use in sprinkling poisonous substances on plants or vines, for the purpose of destroying any vermin that may have collected thereon.

My invention consists in the combination, with a standard, of a reservoir adapted to be adjustably secured to the standard, said reservoir formed with a perforated bottom, whereby the reservoir may be secured to the standard at any desired height, according to the height of the plants or vines to be treated, and the poisonous substance contained in the reservoir sprinkled and evenly distributed over the plant or vines by causing the lower end of the standard to suddenly strike the ground.

In the accompanying drawings, Figure 1 is a view, in perspective, of my improved apparatus. Fig. 2 is an end view, and Fig. 3 is a longitudinal section, of the same.

A designates the standard, which may be made of wood or cast metal, as may be desired, and the same is provided with any number of holes, *a*, and at one end with the handle B. C represents the reservoir, preferably formed of sheet metal. *b* is a hinged cover, and adapted to be fastened in a closed position by means of the spring-catch *c*, or by equivalent means.

It is evident that an ordinary removable cover, having a handle fastened to its upper surface, might be used in lieu of the hinged cover *b*. The lower end of reservoir C is provided with a perforated bottom, *d*, to cause the poisonous matter ejected from the reservoir to be evenly distributed over the plants. To the inner surface of reservoir C is secured a strengthening-piece, *e*, by soldering or otherwise, said piece having perforations *f f'* extending through the same, within which engage the screw-threaded shanks of set-nuts D, one or more, as may be desired.

I do not limit myself to the precise construction above set forth for adjusting the reservoir, as it is evident that many equivalent means may be employed without departing from the spirit of my invention.

The operation of the device is as follows: The reservoir is first filled with paris-green, or any equivalent poisonous substance, and the cover tightly closed, to prevent any upward escape of the poison. The reservoir is then adjusted to the desired height, which is determined in any given instance by the height of the plants or vines to be treated, the object being to secure the reservoir to the standard, so that the poisonous matter shall be delivered in close contact with the vines or plants.

Much difficulty has heretofore been experienced in distributing paris-green upon plants, from the fact that the poison comes in contact with the face and hands of the operator, and is the cause of great irritation and pain, owing to the dangerous character of the material used.

This danger is obviated by the employment of my improved apparatus, as the particles of poison are not allowed to fall a sufficient distance to be wafted by the air and deposited on the body of the operator, but are delivered in close proximity to the plants, and thus evenly and effectually distributed on the same.

The standard to which the reservoir is adjustably secured may be of any desired length, so that the operator may carry the same as a staff, and hence he need not assume a stooping position when engaged at his work. By simply striking the lower end of the standard against the earth, a sufficient quantity of the paris-green can be ejected through the perforated bottom of the reservoir to sprinkle a plant with a sufficient amount of the poison to destroy any number of bugs collected thereon.

It is evident that any granular substance may be deposited in the reservoir, and distributed from the same—as, for instance, powdered gypsum, or other fertilizer, may be used either singly or combined with paris-green, or other poisonous material, and be deposited on plants or vines in the manner above set forth; and hence, although my apparatus is especially designed for use in destroying vermin, I do not limit myself to any particular use of the same, as it may be employed for other purposes, as above indicated.

Having fully described my invention, what I claim as new, and desire to secure by Letters Patent, is—

1. An apparatus for destroying potato-bugs and the like, consisting, essentially, in the combination, with a standard, A, of a reservoir provided with a perforated bottom, said reservoir being adjustably secured to the standard, substantially as set forth.

2. The combination, with the standard A, provided with any desired number of openings through the same, of a reservoir constructed with a perforated bottom, and set-nuts extending through the standard and engaging with the side of the reservoir, substantially as set forth.

3. The combination of vessel C, having a perforated bottom, with a standard, A, adapted to be used in an upright position, and its lower end placed on the ground, substantially as set forth.

In testimony that I claim the foregoing I have hereunto set my hand and seal this 26th day of June, 1877.

ALMON M. ELSWORTH. [L. S.]

Witnesses:
ORSON H. LOOK,
JAMES H. WEEKS.